United States Patent
Neubrand

(10) Patent No.: US 6,419,295 B1
(45) Date of Patent: Jul. 16, 2002

(54) FOLDING TOP REAR QUARTER WINDOW STORAGE SYSTEM

(75) Inventor: Frank G. Neubrand, West Bloomfield, MI (US)

(73) Assignee: CTS Fahrzeug Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 09/779,714

(22) Filed: Feb. 8, 2001

(51) Int. Cl.[7] .............................. B60J 7/12; B60J 1/12; B60J 1/14; B60J 1/18
(52) U.S. Cl. ........................ 296/107.07; 296/146.14; 296/108
(58) Field of Search ................ 296/107.07, 146.14, 296/108

(56) References Cited

U.S. PATENT DOCUMENTS

| | | | |
|---|---|---|---|
| 2,947,570 A | * | 8/1960 | Noe ....................... 396/107.08 |
| 3,536,354 A | * | 10/1970 | Ingram ................... 296/107.07 |
| 4,778,215 A | | 10/1988 | Ramaciotti |
| 4,828,317 A | | 5/1989 | Muscat |
| 4,842,327 A | | 6/1989 | Hennessy |
| 5,029,932 A | * | 7/1991 | Parr ........................... 296/108 |
| 5,118,158 A | | 6/1992 | Truskolaski |
| 5,456,516 A | | 10/1995 | Alexander et al. |
| 5,520,432 A | | 5/1996 | Gmeiner et al. |
| 5,593,202 A | | 1/1997 | Corder et al. |
| 5,625,981 A | | 5/1997 | Klein et al. |
| 5,685,596 A | | 11/1997 | Tokarz et al. |
| 5,746,470 A | | 5/1998 | Seel et al. |
| 5,785,375 A | | 7/1998 | Alexander et al. |
| 5,810,422 A | | 9/1998 | Corder et al. |

FOREIGN PATENT DOCUMENTS

DE 43 20 468 C1 10/1994

* cited by examiner

Primary Examiner—Joseph D. Pape
Assistant Examiner—Hilary Gutman
(74) Attorney, Agent, or Firm—Brooks & Kushman P. C.

(57) ABSTRACT

A retractable vehicle top and rear quarter window combination includes a roof formed by a front roof section and a rear roof section that are pivotally connected to each other and moveable by a top stack drive. The top stack drive includes a linkage having right and left balance links that pivotally connect a respective side of the front roof assembly to one of a right and left bracket. A window pivot bracket pivotally connects each of quarter windows to one of the balance links. The rear quarter windows are rotated inwardly by quarter window control links to pivot the rear quarter window on the balance link as the rear roof is moved.

7 Claims, 4 Drawing Sheets

FOLDING TOP REAR QUARTER WINDOW STORAGE SYSTEM

TECHNICAL FIELD

The present invention relates to an apparatus and system for operating a retractable vehicle top with an attached rear quarter window.

BACKGROUND ART

Retractable tops for vehicles may be "soft top" convertible tops or retractable hard tops. One disadvantage of a retractable hard top is that the linkage used to drive the top between its top up position and its stowed position requires a considerable amount of space within the body of the vehicle when the top is in its stowed position. The top is generally stowed in a top storage well located behind the rear most vehicle seats. The top stack linkage for a retractable hard top requires a substantial amount of space outboard of the rear most vehicle seats in the location where the rear quarter windows are normally stored for a hard top vehicle.

The rear quarter window of a soft top convertible, a sedan or coupe is normally operated by a manual or power actuated drive system that moves the window downwardly into the body of the vehicle to retract and upwardly to cover the window opening. Windows of the "roll down" variety normally ride in tracks that extend vertically in the body of the vehicle outboard of the vehicle seats. Roll down windows may be operated by a passenger to open the window. Roll down rear quarter windows are difficult to provide with a retractable hard top because of the space required adjacent the rear most seats for storage of the retractable hard top linkage mechanism. Space limitations generally preclude the use of roll down windows with a retractable hard top because of the need to use this space for the retractable hard top linkage system.

It has been proposed to provide a rear quarter window that is carried by the retractable top. One such system is disclosed in German Patent DE 43 20 468 C1, wherein the rear window is provided with an extension and retraction mechanism that requires a separate drive linkage for the rear quarter window. While this system has its advantages, the need to provide a separate drive linkage makes this system somewhat more complex and costly. In addition, it is necessary to coordinate opening and closing of the roof with the separate drive mechanism used for retraction and extension of the rear quarter window.

The above problems are addressed by the present invention as summarized below.

DISCLOSURE OF INVENTION

According to the present invention, a retractable hard top and rear quarter window are provided in combination for a vehicle. A roof is formed by a front roof section and a rear roof section that are pivotally connected to each other. The roof is moveable by a top stack drive between a top up position wherein the roof covers a passenger compartment and a stowed position wherein the passenger compartment is uncovered. The two sections of the roof are adjoining in the top up position and are folded together in the stowed position. The roof includes a linkage having right and left balance links. Right and left brackets are attached directly or indirectly to right and left sides of the vehicle body. Each balance link pivotally connects a respective side of the front roof assembly to one of the right and left brackets. A window pivot bracket is attached to the rear quarter window and pivotally connects the rear quarter window to the balance link. A quarter window control link is attached to the window pivot bracket to cause the rear quarter window to be rotated inwardly as the top is moved from the top up position to the stowed position by the quarter window control link. The control link acts on the rear quarter window to pivot the rear quarter window on the balance link.

According to other aspects of the present invention, at the beginning of stowage cycle, the quarter window control link lifts the rear quarter window above a belt line of the vehicle. The rear quarter window is rotated inwardly by the quarter window control link to a generally horizontal orientation between the front and rear roof sections when they are in their stowed position. The quarter window control link is a bar having an outboard end and an inboard end. The bar is connected on the outboard end to the window pivot bracket and on the inboard end the bar is connected to the rear roof section or another member moveable in association with the rear roof section.

The apparatus of the present invention is applicable to retractable hard tops wherein the front and rear sections are substantially rigid members.

The present invention also relates to a method of retracting and deploying right and left rear quarter windows of a retractable vehicle roof. The system for retracting the rear quarter windows includes providing a retractable vehicle roof having a front roof section and a rear roof section. A top stack drive is operatively connected to the vehicle roof. The top stack drive lowers the retractable roof from a top up position to a stowed position. The front roof section is folded over the rear roof section by the top stack drive as it is retracted. Right and left balance links connect right and left side of the front roof section to right and left brackets that are attached to right and left sides of the vehicle. Right and left rear quarter windows are pivotally connected to the right and left balance links respectively. Right and left rear quarter windows are pivoted on right and left balance links in an inboard direction as the retractable roof is lowered. Right and left quarter windows are moved from a position spanning the space between the belt line of the vehicle and the roof to a position wherein the right and left quarter windows are generally horizontally disposed between the front roof section and the rear roof section. The system for deploying the right and left rear quarter windows of a retractable vehicle roof is essentially reversal of the steps required to retract the right and left rear quarter windows as the vehicle roof is deployed.

According to another aspect of the method of the present invention the right and left rear quarter windows are connected by right and left quarter window control links, respectively, and to the rear roof section. The method further comprises moving the rear roof section to cause the rear quarter window control links to pivot right and left rear quarter windows on the balance links.

These and other objects and advantages of the present invention will be better understood upon reference to the attached drawings and following detailed description of the present invention.

BEST MODE FOR CARRYING OUT THE INVENTION

Figure 1:
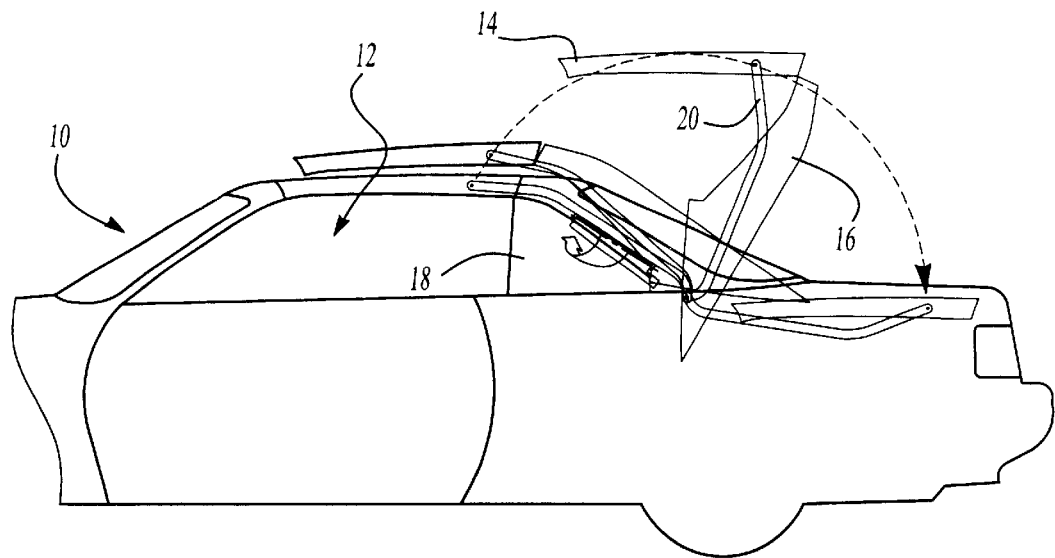
FIG. 1 is a side elevation view showing a vehicle with a retractable top and rear quarter window storage system made in accordance with the present invention.

Referring now to FIG. 1, a vehicle 10 having a passenger compartment 12 and a roof comprising a front roof section 14 and a rear roof section 16 is shown with the front and rear roof sections 14, 16 shown in a range of positions from a top up position through intermediate positions and in the stowed position. A rear quarter window 18 is carried by the rear roof section 16. The rear quarter window 18 is pivotally mounted on a balance link 20 that forms part of the top stack drive linkage that is not otherwise shown in FIG. 1 but is identified by reference numeral 26 as it appears fragmentarily in the other views.

Figure 2:
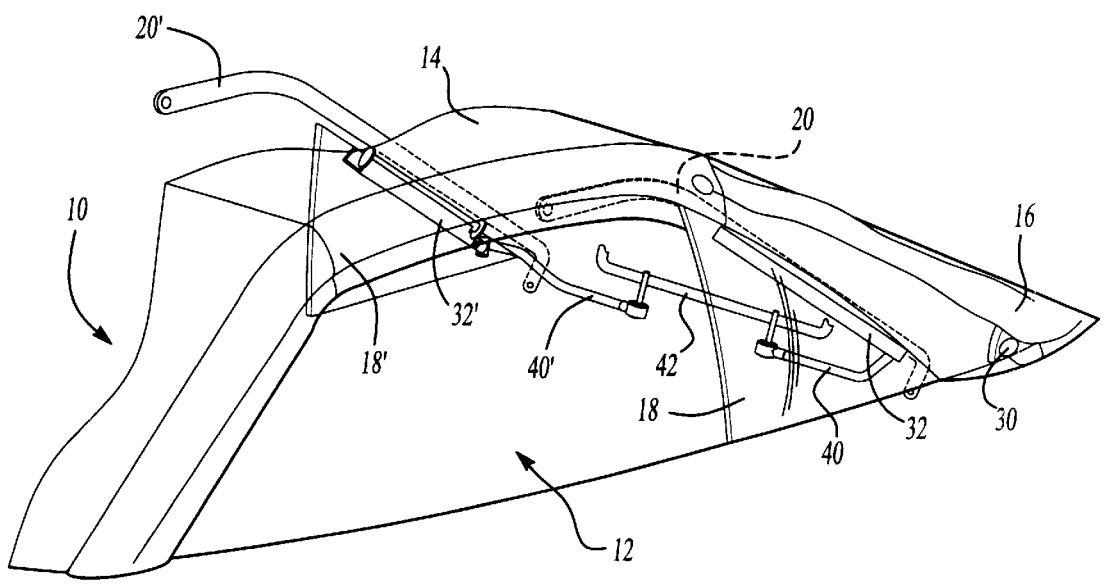
FIG. 2 is a fragmentary perspective view of a retractable top and rear window quarter storage system.
Figure 3:
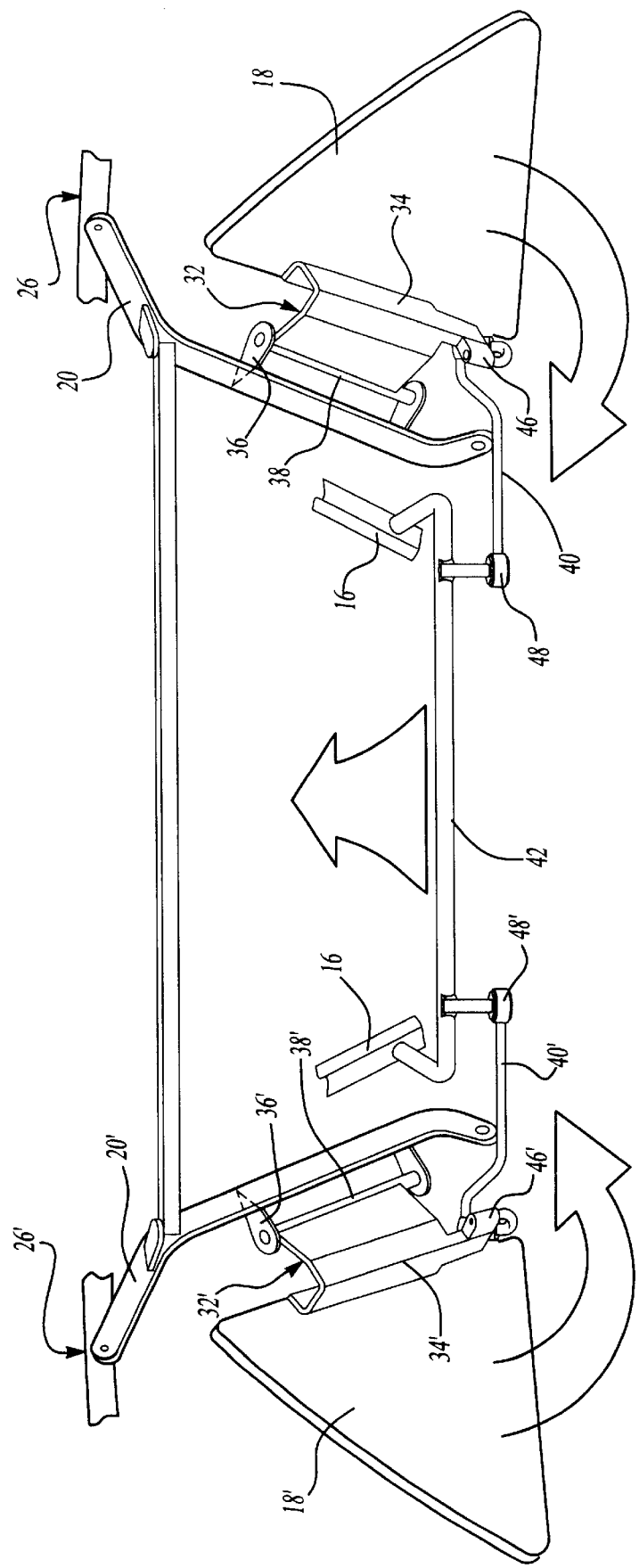
FIG. 3 is a front elevation view of the part of a retractable top and the rear window storage system.

Referring now to FIGS. 2 and 3, the operating mechanism for the rear quarter window 18 is described in greater detail. The vehicle 10 has a retractable hard top including a front roof section 14 and a rear roof section 16. The structure of the roof is symmetrical and references to mirror image parts on the right and left side are identified by the same reference numerals with the reference numeral for right side components including a prime designation. The rear quarter windows 18, 18' are pivotally mounted to the left and right balance links 20, 20'. In FIG. 2, the windows 18, 18' are generally vertically aligned and extend between the rear roof section 16 and the belt line of the vehicle 10. As the roof is retracted from the position shown in FIG. 2, the windows 18, 18' on the left and right sides of the vehicles pivot as shown by the arrows that sweep from the windows 18, 18' toward the center of FIG. 3.

The rear roof is mounted to a roof mounting bracket 30 about which the rear roof section 16 pivots as shown by the center arrow in FIG. 3. The windows 18, 18' are connected to a window pivot bracket indicated by reference numerals 32, 32'. The window pivot bracket 32, 32' includes a window connector 34, 34' which is secured to the rear quarter windows 18, 18'. The window pivot brackets 32, 32' also include a balance link connector 36 that is connected to the window connector 34 by means of a pivot pin 38 that also forms part of the window brackets 32, 32'. The window pivot brackets 32, 32' are connected by window control links 40, 40' to a roof frame bar 42.

A multi-axis pivot 46 is provided on the window connector 34 while a second multi-axis pivot 48 is provided on the roof frame bar 42. The multi-axis pivot 46 is driven in response to movement of the rear roof section 16. The multiaxis pivots 48, 48' on the roof frame bar 42 allow the window control links 40, 40' to move the windows 18, 18' from a position spanning the space between rear roof section 16 and belt line of the vehicle 10 to a position wherein the rear quarter windows 18, 18' are horizontal and disposed between the front roof section 14 and rear roof section 16.

The rear roof section 16 is only partially shown in FIG. 3. The roof frame bar 42 is connected to the rear roof section 16 and could be integrally formed with the rear roof section 16 or could alternatively be formed as a separate member.

Figure 4:
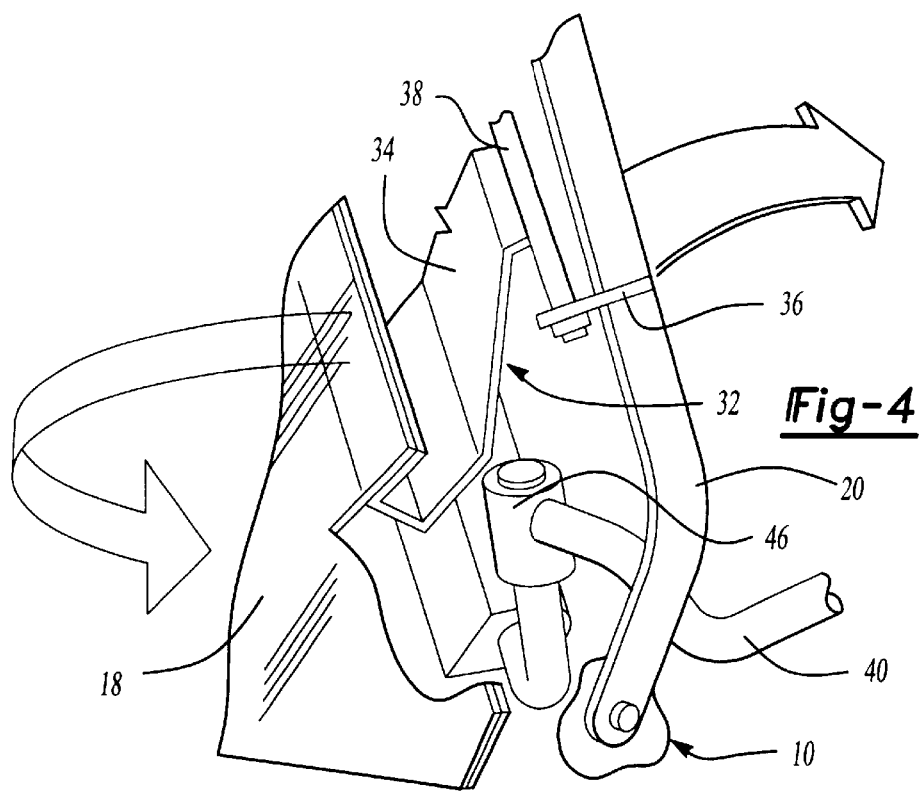
FIG. 4 is a fragmentary side perspective view of part of the linkage for the rear window storage system.

Referring now to FIG. 4, the window pivot bracket 32 is shown from an exterior side. The rear quarter window 18 is shown attached to the window connector 34 that is connected by pivot pin 38 to the balance link connector 36. The window control link 40 is connected to the window pivot bracket 32 by means of the multi-axis pivot 46. The balance link connector 36 is shown connected to the balance link 20 that is in turn pivotally secured to the vehicle 10.

Figure 5:
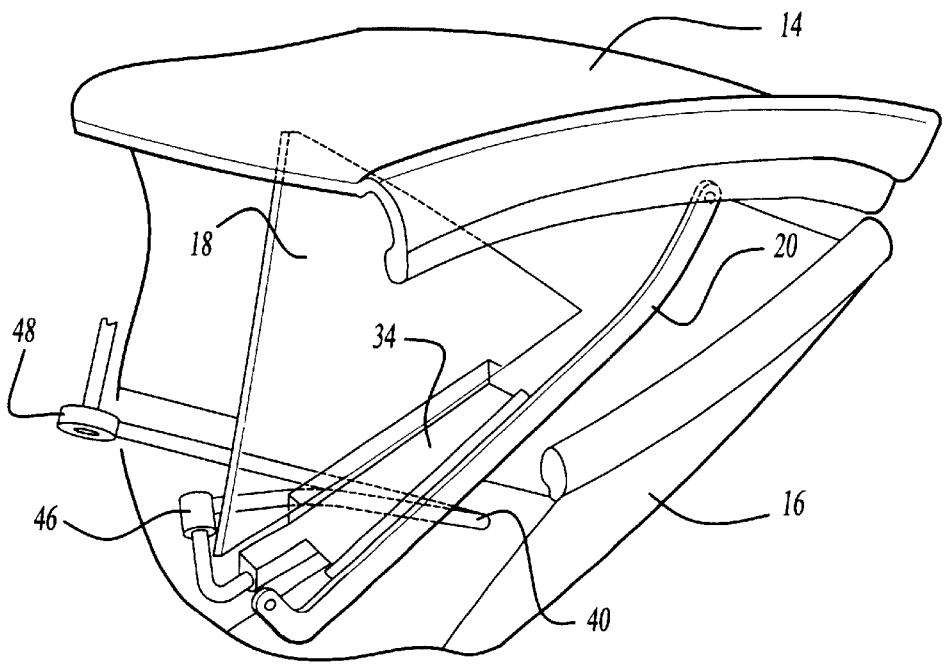
FIG. 5 is a fragmentary perspective view of a rear quarter window and retractable top in a partially folded position.
Figure 6:
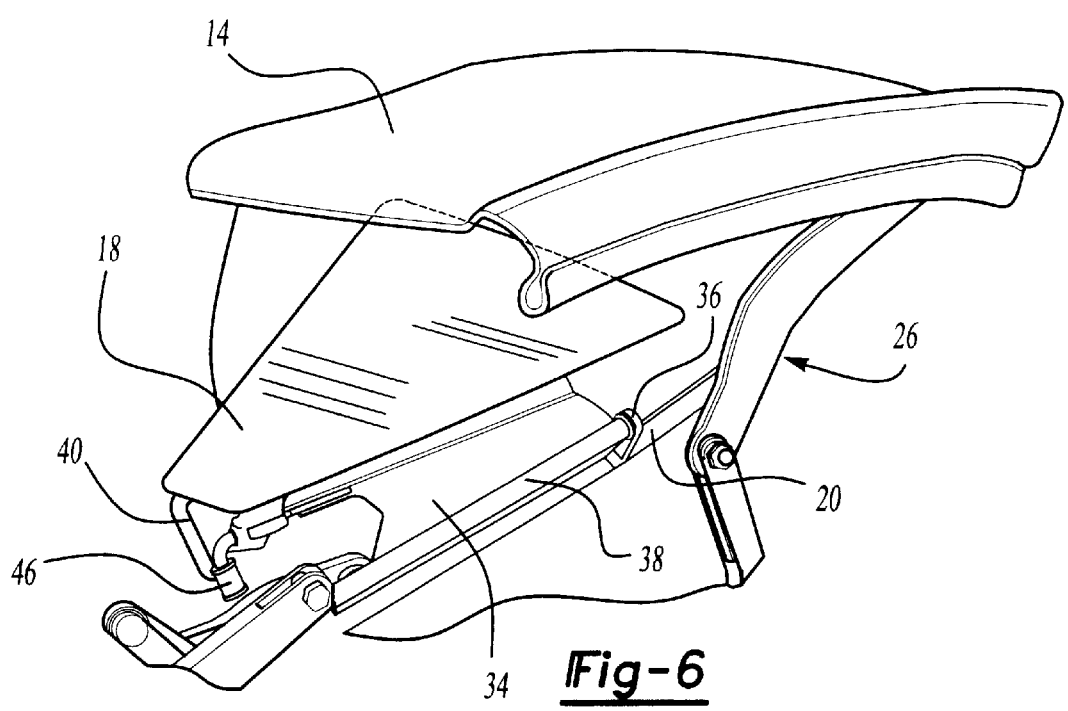
FIG. 6 is a fragmentary perspective view of a retractable top and rear quarter window in a nearly fully retracted position.

Referring now to FIGS. 5 and 6, movement of the rear quarter window 18 is shown in two different retraction positions. The window 18 is connected to the window connector 34 and is at approximately 45° as shown in FIG. 5. In FIG. 6 the window 18 is shown nearly horizontal and disposed below the front roof section 14. The window control link 40 acts upon the rear quarter window 18 as the roof frame bar and rear roof section 16 move in a forward direction relative to the vehicle. The window connector 34 pivots on the pivot pin 38 that is connected by the balance link connector 36 to the balance link 20. The top stack drive linkage 26 is fragmentarily shown in FIG. 6. The window control links 40 pivot within the drive multi-axis pivot 46 that is connected to the window connector 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable vehicle top and a rear quarter window combination for a vehicle having a vehicle body and a passenger compartment comprising:

a roof formed by a front roof section having right and left sides and a rear roof section that are pivotally connected to each other;

a top stack drive linkage for moving the roof between a top up position wherein the roof covers the passenger compartment and a stowed position wherein the passenger compartment is uncovered;

right and left roof mounting brackets attached, respectively, to right and left sides of the vehicle body, and pivotally connected to the rear roof section;

right and left balance links connected to the top stack drive linkage, each right and left balance link pivotally connecting one of the right and left sides of the front roof section to one of the right and left roof mounting brackets;

right and left rear quarter windows;

right and left window pivot brackets attached to the right and left rear quarter windows, respectively, and pivotally connecting each of the rear quarter window to the balance links; and right and left quarter window control links operatively connected to the right and left pivot brackets to cause the rear quarter windows to rotate inwardly as the top is moved between the top up position and the stowed position by the top stack drive linkage, the quarter window control links acting on the rear quarter windows to pivot the rear quarter windows on the balance links to a generally horizontal orientation between the front roof section and rear roof section in the stowed position.

2. The retractable vehicle top and rear quarter window combination of claim 1 wherein when the roof begins to move from the top up position to the stowed position, each of the quarter window control links lift one of the rear quarter windows above the belt line of the vehicle.

3. The retractable vehicle top and rear quarter window combination of claim 1 wherein each of the quarter window control links are attached to the rear roof section and are attached to the right and left rear quarter windows.

4. The retractable vehicle top and rear quarter window combination of claim 1 wherein the rear roof section has a lower section and wherein the quarter window control links each are bars having an outboard end and an inboard end, the outboard ends of the bars connect to a first set of pivot connectors and the inboard ends of the bars connect to a second set of pivot connectors on the lower portion of the rear roof section.

5. The retractable vehicle top and rear quarter window combination of claim 1 wherein the roof is a retractable hard top wherein the front and rear sections are substantially rigid members.

6. A method of retracting and deploying right and left rear quarter windows of a retractable vehicle roof for a vehicle having a belt line, the method comprising:

providing the retractable vehicle roof having a front roof section and a rear roof section, right and left balance links connecting right and left sides of the front roof section to right and left body mounting brackets that are attached to right and left sides of the vehicle, right and left rear quarter windows being pivotally connected to the right and left balance links, respectively, and a top stack drive operatively connected to the vehicle roof;

actuating the top stack drive to raise and lower the retractable roof between a top up position to a stowed position;

folding and unfolding the front roof section relative to the rear roof section; and pivoting the right and left rear quarter windows on the right and left balance links in an inboard direction as the retractable roof is lowered, the right and left quarter windows being moved from a position spanning the space between a belt line of the vehicle and the roof to a position wherein the right and left rear quarter windows are generally horizontally disposed between the front roof section and the rear roof section, and pivoting the right and left rear quarter windows on the right and left balance links in an outboard direction as the retractable roof is raised, the right and left quarter windows being moved from a first position wherein the right and left rear quarter windows are generally horizontally disposed between the front roof section and the rear roof section to a second position spanning the space between the belt line of the vehicle and the roof.

7. The method of claim 6 wherein the right and left quarter window control links have first and second ends and the right and left rear quarter windows are connected to the first end of the right and left quarter window control links and the second end of the right and left quarter window control links are connected to the rear roof section, wherein movement of the rear roof section causes the right and left quarter window control links to pivot the right and left rear quarter windows on the right and left balance links, respectively.

* * * * *